United States Patent
Kobayashi et al.

(10) Patent No.: US 8,031,462 B2
(45) Date of Patent: Oct. 4, 2011

(54) MOLDED COMPONENT, ELECTRONIC APPARATUS, AND METHOD OF PRODUCING A MOLDED COMPONENT

(75) Inventors: Fujio Kobayashi, Kanagawa (JP); Masashi Torimoto, Saitama (JP); Shizuo Arai, Kanagawa (JP); Katsuharu Kajikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 113 days.

(21) Appl. No.: 12/588,427

(22) Filed: Oct. 15, 2009

(65) Prior Publication Data

US 2010/0124002 A1 May 20, 2010

(30) Foreign Application Priority Data

Nov. 18, 2008 (JP) ................................. 2008-294175

(51) Int. Cl.
*H05K 5/00* (2006.01)
(52) U.S. Cl. ............................... 361/679.01; 348/333.01
(58) Field of Classification Search ............. 361/679.01; 348/333.01
See application file for complete search history.

(56) References Cited

U.S. PATENT DOCUMENTS

| | | | | |
|---|---|---|---|---|
| 5,738,321 A * | 4/1998 | Moriyasu | | 248/274.1 |
| 6,819,547 B2 * | 11/2004 | Minaguchi et al. | | 361/679.01 |
| 7,248,463 B2 * | 7/2007 | Bander et al. | | 361/679.27 |
| 7,385,806 B2 * | 6/2008 | Liao | | 361/679.01 |
| 7,692,721 B2 * | 4/2010 | Kanai | | 348/374 |
| 7,894,181 B2 * | 2/2011 | Iwamoto et al. | | 361/679.21 |
| 2004/0004667 A1 * | 1/2004 | Morikawa et al. | | 348/333.06 |
| 2005/0084252 A1 * | 4/2005 | Satou et al. | | 386/126 |
| 2005/0147397 A1 * | 7/2005 | Isawa et al. | | 386/117 |
| 2005/0200745 A1 * | 9/2005 | Lee | | 348/371 |
| 2005/0200755 A1 * | 9/2005 | Park | | 348/376 |
| 2007/0058075 A1 * | 3/2007 | DeSorbo | | 348/373 |
| 2008/0159712 A1 * | 7/2008 | Hayashi et al. | | 386/117 |
| 2009/0096908 A1 * | 4/2009 | Amano | | 348/333.01 |
| 2009/0268384 A1 * | 10/2009 | Hsu et al. | | 361/679.01 |
| 2010/0046162 A1 * | 2/2010 | Chen et al. | | 361/679.55 |
| 2010/0085690 A1 * | 4/2010 | Zou et al. | | 361/679.01 |

FOREIGN PATENT DOCUMENTS

| | | |
|---|---|---|
| JP | 2000-210971 | 8/2000 |
| JP | 3472403 | 9/2003 |

* cited by examiner

*Primary Examiner* — Lisa Lea Edmonds
(74) *Attorney, Agent, or Firm* — Rader, Fishman & Grauer PLLC

(57) ABSTRACT

A molded component includes: a primary molded layer including a boxlike base portion that has a width direction in a first direction, a length direction in a second direction, and a height direction in a third direction and includes a first surface protruding in the third direction and a second surface that forms a spatial portion on the other side of the first surface, and a pedestal portion protruding outwardly in parallel to the first direction and the second direction from a circumferential edge of the base portion; a secondary molded layer formed of an optically-transparent resin material, that is laminated on the primary molded layer and has the same width and length as the primary molded layer; and an in-mold layer formed between the primary molded layer and the secondary molded layer.

9 Claims, 12 Drawing Sheets

MOLDED COMPONENT, ELECTRONIC APPARATUS, AND METHOD OF PRODUCING A MOLDED COMPONENT

BACKGROUND OF THE INVENTION

1. Field of the Invention

The present invention relates to a molded component having excellent durability and design, an electronic apparatus that uses the molded component for a casing thereof, and a method of producing a molded component.

2. Description of the Related Art

As a method of decorating a surface of an injection-molded component during molding, there is known, for example, an in-mold molding method. The in-mold molding involves pressing a film that is obtained by causing a pattern to adhere onto a sheet in advance by a print method, a vapor deposition method, or the like into a die, and transferring, simultaneous with molding of a resin, the pattern onto a surface of the molding resin (see, Japanese Patent Application Laid-open No. 2000-210971). However, an exposure of an in-mold layer on a surface of the molded component decorated by the in-mold molding is apt to cause an inconvenience that a decorative effect lessens due to abrasions and damages or an appearance is impaired.

On the other hand, there is known a two-color molding method for forming, on a surface of a primary molded component, a secondary molded layer formed of a resin different from a primary molding resin. For example, Japanese Patent No. 3,472,403 (hereinafter, referred to as Patent Document 2) discloses a method of molding a transparent secondary molding resin on a surface of a primary molding resin onto which an in-mold layer has been transferred. In Patent Document 2, the primary molding resin and the secondary molding resin are molded by respectively injecting a molten resin from a primary molding resin injection path and a secondary molding resin injection path formed in a common core. Furthermore, Patent Document 2 also discloses a molding method in which a surface of the secondary molded layer is additionally decorated by the in-mold molding method.

SUMMARY OF THE INVENTION

In recent years, an injection-molded body formed of a plastic material is widely used as a casing portion of an electronic apparatus. In particular, by using a molding method that uses both the in-mold molding method and the two-color molding method, it is expected that it becomes possible to design a product having excellent design and a high design effect.

In the molding method disclosed in Patent Document 2, however, since a resin injection direction is restricted, a resultant molded component is limited to a configuration in which the secondary molding resin covers a side surface of the primary molding resin. Therefore, when molding a boxlike component having an opening as in a shape of a plate, only a component in which an outer circumferential portion of the opening is covered by the secondary molding resin can be obtained, with the result that a degree of freedom in design is restricted. Moreover, in such a molded component, an interfacial peeling of the primary and secondary molding resins is apt to occur when a drop impact or an excessive stress is applied to the outer circumferential portion, which is disadvantageous in terms of a molding quality. Furthermore, there still remains a problem on durability of the in-mold layer transferred onto the surface of the secondary molding resin.

In view of the circumstances as described above, there is a need for a molded component having excellent molding quality and durability, an electronic apparatus that uses the molded component for a casing, and a method of producing a molded component.

According to an embodiment of the present invention, there is provided a molded component including a primary molded layer, a secondary molded layer, and an in-mold layer.

The primary molded layer includes a boxlike base portion and a pedestal portion. The base portion has a width direction in a first direction, a length direction in a second direction, and a height direction in a third direction. The base portion includes a first surface protruding in the third direction and a second surface that forms a spatial portion on the other side of the first surface. The pedestal portion protrudes outwardly in parallel to the first direction and the second direction from a circumferential edge of the base portion.

The secondary molded layer is formed of an optically-transparent resin material, laminated on the primary molded layer, and has the same width and length as the primary molded layer.

The in-mold layer is formed between the primary molded layer and the secondary molded layer.

In the molded component having the structure described above, since the secondary molded layer is formed of an optically-transparent or translucent material, the in-mold layer can be visually recognized from the outside and effectively protected from damages and abrasions.

Moreover, since the molded component is substantially boxlike such that the base portion forms the spatial portion therein, the molded component can be used for a constituent component of a casing, a protection panel for an electronic component, and the like.

Further, because the secondary molded layer is formed to have the same width and length as the primary molded layer, the secondary molded layer does not cover a circumferential side surface of the pedestal portion. Therefore, a circumferential side portion of the molded component forms a multi-layer structure of the primary molded layer and the secondary molded layer unlike the case where it is covered by the secondary molded layer. Accordingly, design of the circumferential side portion of the molded component is improved, and product design with a high visual effect becomes possible.

Furthermore, since the secondary molded layer is formed to have the same width and length as the primary molded layer, even when an outer circumferential portion of the molded component is applied with a drop impact or an excessive stress, an interfacial peeling between the primary molded layer and the secondary molded layer can be effectively prevented from occurring.

The base portion is typically structured as an injection-molded body formed of a synthetic resin material. However, the base portion may instead be a processed metal plate. The base portion is substantially boxlike such that the spatial portion is formed therein, but a cross-sectional shape thereof is not particularly limited. A type and color of material constituting the base portion is not particularly limited and are set based on a desired design, a required mechanical intensity, and the like.

The pedestal portion protrudes outwardly in the width direction and the length direction from the circumferential edge of the base portion. The circumferential edge of the base portion is typically a circumferential edge of an opening on the second surface side facing the spatial portion. The pedestal portion protrudes from the circumferential edge in a flanged manner and defines a width dimension and length dimension of the primary molded layer. It should be noted that the pedestal portion is not limited to being formed along an entire circumference of the circumferential edge of the base portion and may instead by formed partially.

The in-mold layer is typically a print layer for decorating the primary molded layer and on which a pattern, letter, and the like are expressed. In addition to that described above, the in-mold layer includes various wiring layers, information recording layers, an electrical device such as a solar cell, an optical device, and the like.

A boundary between the first surface and the pedestal portion may be curved.

With this structure, a drawing rate of an in-mold foil at wall surfaces forming a cavity of the die can be lowered. Thus, it is possible to suppress wrinkles or rips at a time of forming the in-mold layer. Further, an aesthetic decoration layer can be formed stably.

The secondary molded layer may have a thickness gradient.

With this structure, it becomes possible to differentiate visual effects of the decoration layer depending on a viewing position and impart a depth to the design.

According to an embodiment of the present invention, there is provided an electronic apparatus including a first casing and a second casing.

The first casing includes a primary molded layer, a secondary molded layer, and an in-mold layer. The primary molded layer includes a boxlike base portion and a pedestal portion. The base portion has a width direction in a first direction, a length direction in a second direction, and a height direction in a third direction. The base portion includes a first surface protruding in the third direction and a second surface that forms a spatial portion on the other side of the first surface. The pedestal portion protrudes outwardly in parallel to the first direction and the second direction from a circumferential edge of the base portion. The secondary molded layer is formed of an optically-transparent resin material, laminated on the primary molded layer, and has the same width and length as the primary molded layer. The in-mold layer is formed between the primary molded layer and the secondary molded layer.

The second casing includes an accommodation portion that accommodates the first casing.

The first casing typically constitutes a main casing portion of the electronic apparatus. The second casing can be structured as a casing portion of an electronic apparatus accompanying the first casing. As one embodiment, the second casing constitutes a movable portion that is opened and closed by an operation of a user. In addition, the second casing can be caused to function as the casing portion that protects a predetermined electronic component.

In the electronic apparatus having the structure described above, since the secondary molded layer is formed of an optically-transparent or translucent material, the in-mold layer can be visually recognized from the outside and effectively protected from damages and abrasions. Moreover, since the second casing is practically boxlike with the spatial portion formed therein, it can be used for a protection panel for an electronic component and the like.

According to an embodiment of the present invention, there is provided a method of producing a molded component, including placing a transfer film for supporting an in-mold layer in a first cavity. By injecting and filling a molten resin between a movable core and the first cavity from the movable core side, a primary molded layer is formed.

The primary molded layer includes a boxlike base portion and a pedestal portion. The base portion has a width direction in a first direction, a length direction in a second direction, and a height direction in a third direction. The base portion includes a first surface protruding in the third direction, on which the in-mold layer is transferred, and a second surface that forms a spatial portion on the other side of the first surface. The pedestal portion protrudes outwardly in parallel to the first direction and the second direction from a circumferential edge of the base portion.

By injecting and filling an optically-transparent molten resin between the movable core and a second cavity that accommodates the primary molded layer, a secondary molded layer is formed. The secondary molded layer is laminated on the primary molded layer with the in-mold layer interposed therebetween and has the same width and length as the primary molded layer.

According to the molding method, it becomes possible to produce a molded component having a multilayer structure including the primary molded layer, the in-mold layer, and the secondary molded layer structured as described above.

As described above, according to the embodiments of the present invention, a molded component having excellent durability and design and an electronic apparatus that uses the molded component for a casing portion can be provided.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, an embodiment of the present invention will be described with reference to the drawings.

(Overall Structure of Electronic Apparatus)

Figure 1:
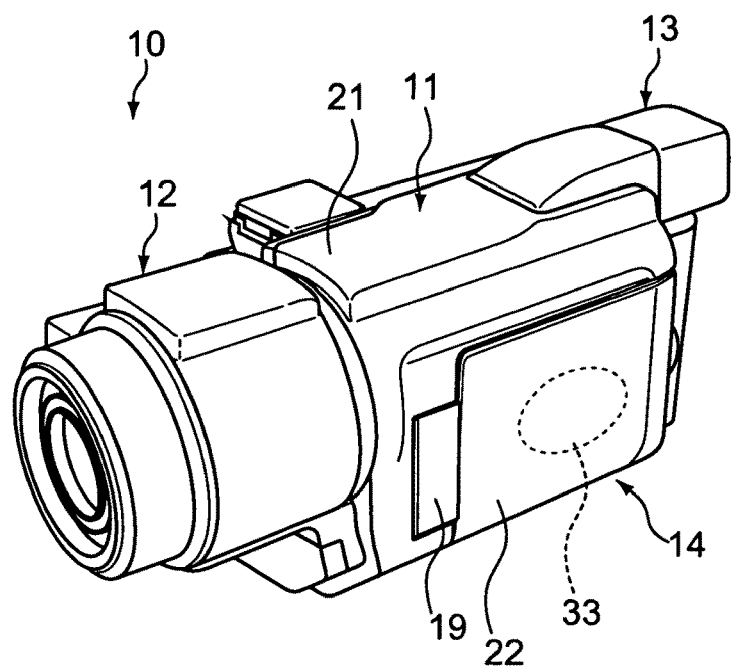
FIG. 1 is an overall perspective view of an electronic apparatus according to an embodiment of the present invention seen from a front side.
Figure 2:
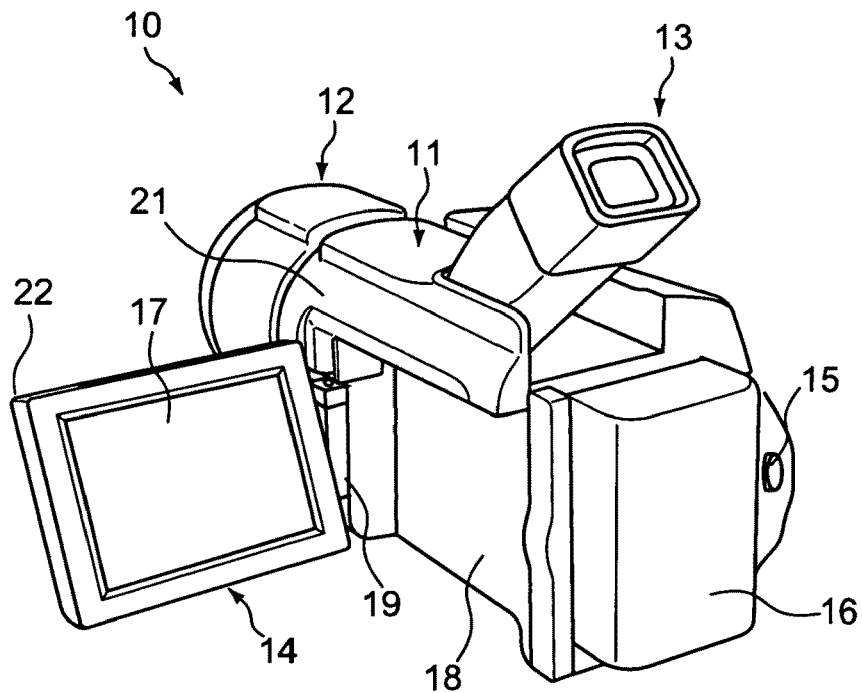
FIG. 2 is a perspective view of the electronic apparatus seen from a back side.

FIGS. 1 and 2 each show an overall structure of an electronic apparatus according to an embodiment of the present invention. In this embodiment, a handy video camera (hereinafter, simply referred to as "video camera") is exemplified as the electronic apparatus.

A video camera 10 includes a main body portion 11, a lens tube portion 12 including an imaging lens, a viewfinder portion 13, and a display portion 14. The lens tube portion 12 is positioned on a front side of the main body portion 11. The viewfinder portion 13 is attached rotatably on an upper surface of the main body portion 11. The display portion 14 includes a display device 17 for displaying a captured image and is attached rotatably to a side surface of the main body portion 11. Although detailed illustrations are omitted, the main body portion 11 is provided with a record start/stop button 15, various operation buttons, and a switch. A battery 16 is attached detachably on a back surface of the main body portion 11.

An appearance of the video camera 10 is mainly constituted of a first casing component 21 and a second casing component 22. The first casing component 21 constitutes a casing portion of the main body portion 11, and the second casing component 22 constitutes a casing portion of the display portion 14. The first casing component 21 is held by a hand of a user at a time the video camera 10 is operated. The second casing component 22 is held by a hand and fingers of a user to be opened and closed or rotated when the display portion 14 is used and functions to protect the display device 17 of the display portion 14.

The display portion 14 is formed to be substantially rectangular. When the video camera 10 is not used, the display portion 14 is typically accommodated in an accommodation portion 18 formed on the side surface of the main body portion 11. The display portion 14 is supported on the side surface of the main body portion 11 via an attachment member 19 attached to one side portion thereof. The display portion 14 is rotatable about a shaft parallel to a height direction of the main body portion 11 (first shaft) and a shaft orthogonal to the first shaft (second shaft) via the attachment member 19. With this structure, when using the video camera 10, it is possible to pull out the display portion 14 from the accommodation portion 18 and position the display device 17 at a desired elevation angle on the back surface side of the main body portion 11 as a user side as shown in FIG. 2.

Here, the display device 17 can be constituted of a liquid crystal display, an organic EL (Electro Luminescence) display, and the like.

(Structure of Second Casing Portion)

Next, the casing portion (second casing component 22) of the display portion 14 will be described in detail.

Figure 3:
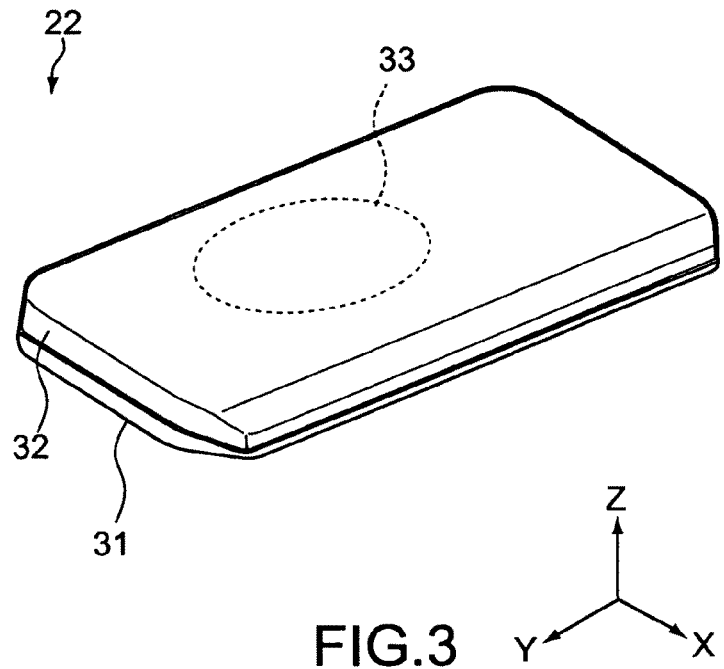
FIG. 3 is an overall perspective view of a molded component constituting a casing portion of a display portion of the electronic apparatus.
Figure 4:
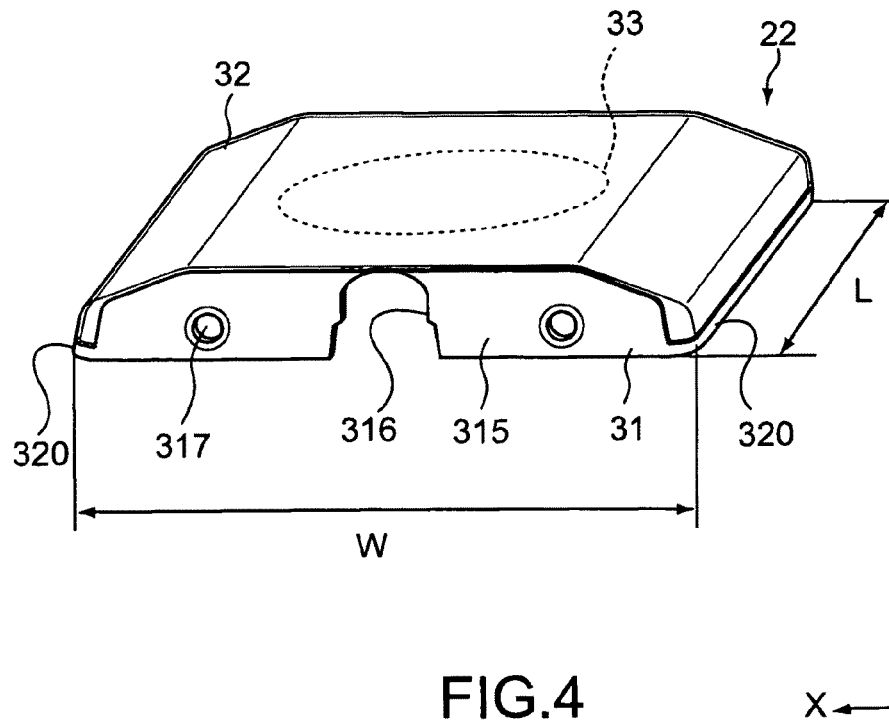
FIG. 4 is a perspective view of the molded component seen from a different angle.
Figure 5:
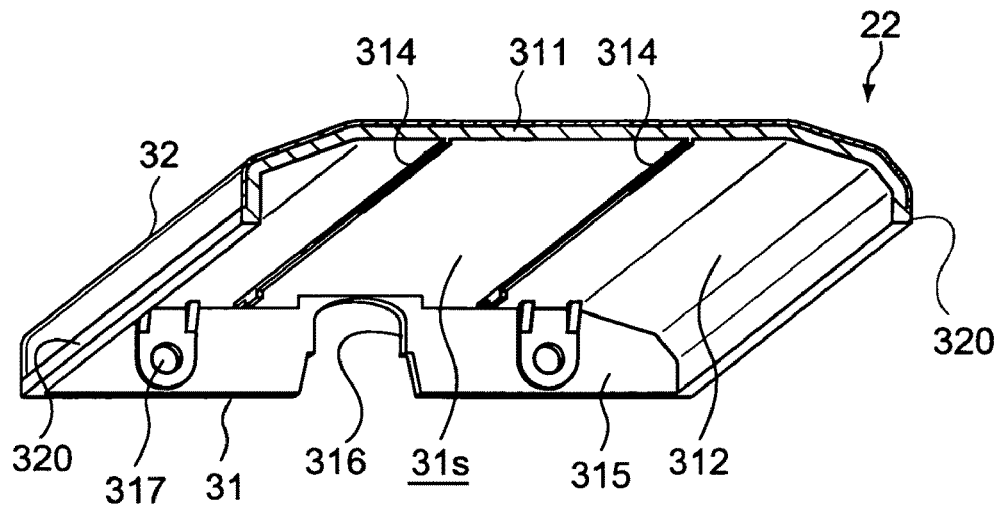
FIG. 5 is a perspective cross-sectional diagram of a main portion of the molded component.
Figure 5:
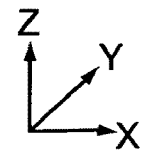
Figure 6:
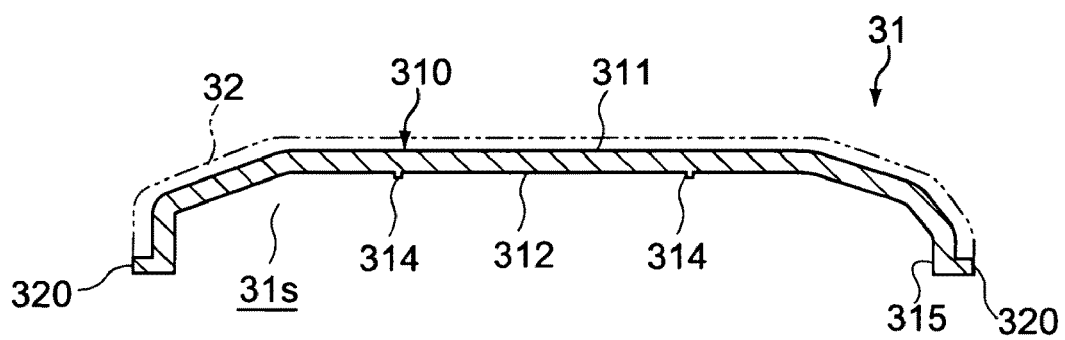
FIG. 6 is a cross-sectional diagram of a primary molded layer constituting the molded component.
Figure 6:
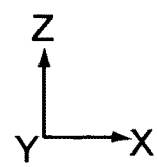

FIGS. 3 to 5 are perspective views each showing a structure of the second casing component 22. The second casing component 22 is a molded component that includes a primary molded layer 31, a secondary molded layer 32, and an in-mold layer 33. FIG. 6 is a cross-sectional diagram showing the primary molded layer 31.

(Primary Molded Layer (Base Portion))

The primary molded layer 31 is a substantially-plate-like (boxlike) injection-molded body formed of a plastic material and has a width direction in a first direction (X-axis direction), a length direction in a second direction (Y-axis direction), and a height direction in a third direction (Z-axis direction). As shown in FIGS. 5 and 6, the primary molded layer 31 includes a base portion 310 and a pedestal portion 320.

The base portion 310 includes a convex surface 311 (first surface) that protrudes in the Z-axis direction and on which the in-mold layer 33 and the secondary molded layer 32 are laminated. The base portion 310 also includes a concave surface 312 (second surface) that forms a spatial portion 31s on the other side of the convex surface 311. The spatial portion 31s has a predetermined volume for accommodating the display device 17. On the concave surface 312, a plurality of ribs 314 for reinforcing the base portion 310 are formed.

The base portion 310 has an almost-uniform cross-sectional shape along the length direction (Y-axis direction) thereof. In this embodiment, the cross-sectional shape is a bent arc, though not limited thereto. The cross-sectional shape may instead be a rectangle, a curved surface, or other geometrical shapes.

The spatial portion 31s is defined by the concave surface 312 and side walls surrounding the base portion 310. One of side wall portions 315 formed at an end portion of the base portion 310 in the length direction functions as a coupling wall portion that is coupled to the attachment member 19. Specifically, the side wall portion 315 includes screw holes 317 for coupling the second casing component 22 to the attachment member 19 and a notch 316 for accommodating a rotary shaft (second shaft described above) of the second casing component 22 with respect to the attachment member 19.

(Primary Molded Layer (Pedestal Portion))

The pedestal portion 320 protrudes outwardly in a flanged manner in the width direction (X-axis direction) and the length direction (Y-axis direction) from the circumferential edge of the base portion 310. In this embodiment, the pedestal portion 320 is formed continuously in a uniform shape over an entire area of a circumferential side portion excluding the side wall portion 315 fixed to the attachment member 19 along an outer circumferential portion of an opening on the concave surface 312 side facing the spatial portion 31s.

A type of material constituting the primary molded layer 31 is not particularly limited, and a general-purpose resin such as an ABS (Acrylonitrile Butadiene Styrene) resin or an engineering plastic such as a PC (Polycarbonate) resin and an ABS-PC mixed resin can be used. A resin color of the primary molded layer 31 is also not particularly limited, and the resin may be transparent or translucent. A gate location of the primary molded layer 31 can be set at an arbitrary position on the concave surface 312 of the base portion 310.

(Secondary Molded Layer)

The secondary molded layer 32 is laminated on the primary molded layer 31. More specifically, the secondary molded layer 32 is laminated on a surface of the base portion 310 on the convex surface 311 side and a surface of the pedestal portion 320 on the same convex surface 311 side. With this structure, as shown in FIGS. 4 and 6, the secondary molded layer 32 is formed with the same width (W) and length (L) as the primary molded layer 31.

The secondary molded layer 32 is formed with substantially the same thickness along the shape of the convex surface 311 of the primary molded layer 31. A thickness of the secondary molded layer 32 is equal to or smaller than a thickness of the primary molded layer 31, but it is also possible for the thickness to be larger than that of the primary molded layer 31. In this embodiment, a thickness of the second casing component 22 in the Z-axis direction is 1.3 mm and thicknesses of the primary molded layer 31 and the secondary molded layer 32 in the Z-axis direction are each 0.65 mm, though of course not limited thereto.

Further, the shape of the secondary molded layer 32 is not limited to this example and may be any arbitrary shape such as a rectangle and a bent shape irrespective of the shape of the primary molded layer 31.

The secondary molded layer 32 is an injection-molded body formed of a transparent or translucent resin material having optical transparency. The secondary molded layer 32 may instead be a colored transparent body. A gate location of the secondary molded layer 32 can be set at an arbitrary position on a surface including a circumferential side surface. The secondary molded layer 32 is formed for protecting the in-mold layer 33 to be described later, enabling the in-mold layer 33 to be visually recognized from outside the second casing component 22, and enhancing a design effect of the second casing component 22.

A type of material constituting the secondary molded layer 32 is not particularly limited, and a transparent or translucent resin such as PMMA (Polymethylmethacrylate (acryl)), PC, and PS (Polystyrene) may be used.

(In-Mold Layer)

The in-mold layer 33 is formed between the primary molded layer 31 and the secondary molded layer 32. Typically, the in-mold layer 33 is a print layer that decorates the primary molded layer 31 and on which a pattern, letter, and the like are expressed. The in-mold layer 33 is a transfer layer formed on the convex surface 311 of the primary molded layer 31 by an in-mold molding method. A formation range of the in-mold layer 33 is a part or all of the convex surface 311 of the primary molded layer 31. The in-mold layer 33 may be formed on the surface of the pedestal portion 320. In this embodiment, the in-mold layer 33 is formed at substantially the center portion of the convex surface 311.

A design of the in-mold layer 33 is set freely based on a shape, size, color tone, and the like of the second casing component 22. It is also possible to design the in-mold layer 33 so that it constitutes a main portion of design of the second casing component 22.

In addition to the print layer, the in-mold layer 33 includes various wiring layers, information recording layers, an electrical device such as a solar cell, an optical device, and the like. An example of the wiring layer is a drive circuit of the display device 17. If the in-mold layer 33 is constituted of an LED circuit, it is possible to light up the second casing component 22 with LEDs. Examples of the information recording layer include a magnetic recording layer, a hologram device, and an RFID substrate including a semiconductor chip. The solar cell can be used as a power source of the display device 17, for example.

To the formation of the in-mold layer 33 with respect to the primary molded layer 31, an in-mold molding method that involves molding the primary molded layer 31 by pressing an in-mold foil into a die as will be described later is applied. Because the in-mold foil is pressed against wall surfaces of the die by a resin molding pressure, a drawing rate of the in-mold foil increases at a position where a wall surface shape changes sharply, thus causing wrinkles and damages. Therefore, by forming the convex surface 311 of the primary molded layer 31 so as not to generate any sharp corner portion or by forming a boundary portion between the base portion 310 and the pedestal portion 320 to be a gentle curve, an appropriate transfer process of the in-mold layer 33 can be ensured.

(Operation of this Embodiment)

In the second casing component 22 of this embodiment, since the secondary molded layer 32 is formed of an optically-transparent or translucent material, the in-mold layer 33 can be visually recognized from the outside and effectively protected from damages and abrasions.

Moreover, since the second casing component 22 is substantially boxlike with the base portion 310 forming the spatial portion 31s therein, the second casing component 22 can sufficiently function as a protection panel of the display device 17.

On the other hand, because the secondary molded layer 32 is formed with the same width and length as the primary molded layer 31, the circumferential side surface of the pedestal portion 320 is not covered by the secondary molded layer 32. Therefore, the circumferential side portion of the second casing component 22 constitutes a multilayer structure including the primary molded layer 31 and the secondary molded layer 32 unlike the case where the circumferential side portion is covered by the secondary molded layer 32. Accordingly, design of the circumferential side portion of the second casing component 22 is improved, and product design with a high visual effect becomes possible.

Furthermore, because the secondary molded layer 32 is formed with the same width and length as the primary molded layer 31, even when an outer circumferential portion of the second casing component 22 receives a drop impact or an excessive stress, an interfacial peeling between the primary molded layer 31 and the secondary molded layer 32 can be effectively prevented from occurring.

The secondary molded layer 32 laminated on the convex surface 311 of the primary molded layer 31 is not limited to the example of being formed with a uniform thickness and may be formed to have a thickness gradient. For example, a thickness gradient may be provided in the length direction (Y-axis direction) and the width direction (X-axis direction) in an area where the in-mold layer 33 is formed. With this structure, it becomes possible to differentiate visual effects of the in-mold layer 33 depending on a viewing position and impart a depth to the design.

In addition, the surface of the primary molded layer 31 and/or the secondary molded layer 32 may be processed. Since the thickness of the secondary molded layer 32 can be changed even by this processing, a contribution can be made to an enhancement of a design effect.

(Method of Producing Second Casing Portion)

Next, a production method of the second casing component 22 structured as described above will be described.

(Formation of Primary Molded Layer)

Figure 7:
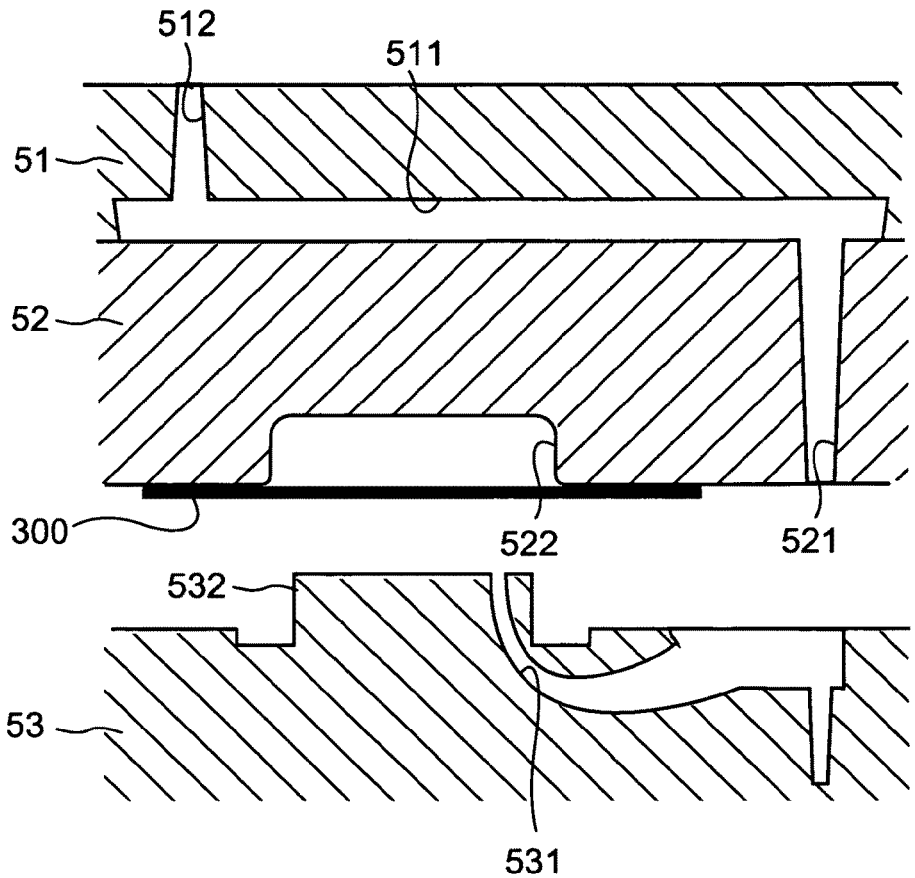
FIG. 7 is a schematic cross-sectional diagram of a die portion for forming a primary molded layer in a die apparatus for producing the molded component.

FIG. 7 is a schematic cross-sectional diagram of a die portion for forming the primary molded layer 31 in a die apparatus for producing a molded component constituting the second casing component 22. The die apparatus is of a 3-plate type and includes a first die plate 51 and second die plate 52 as a fixed side and a third die plate 53 as a movable side.

The second die plate 52 includes a first cavity 522 for primary molding. The third die plate 53 includes a core 532 (movable core) for primary molding. The core 532 is accommodated inside the first cavity 522 when the second die plate 52 and the third die plate 53 are mold-clamped. A gap space between the first cavity 522 and the core 532 has an inner shape corresponding to an outer shape of the primary molded layer 31. Therefore, by solidifying a resin filled in the gap space, the primary molded layer 31 having the structure described above is formed (FIG. 6).

An in-mold foil 300 is placed between the second die plate 52 and the third die plate 53. The in-mold foil 300 is placed on the second die plate 52 side so as to cover the first cavity 522. The in-mold foil 300 is supplied from outside the die apparatus shown in the figure by a roll-to-roll method, for example.

Figure 8:
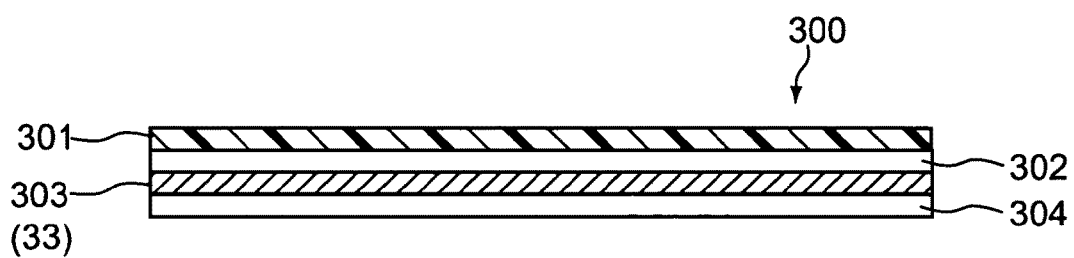
FIG. 8 is a schematic cross-sectional diagram of an in-mold foil placed inside the die apparatus.
Figure 9:
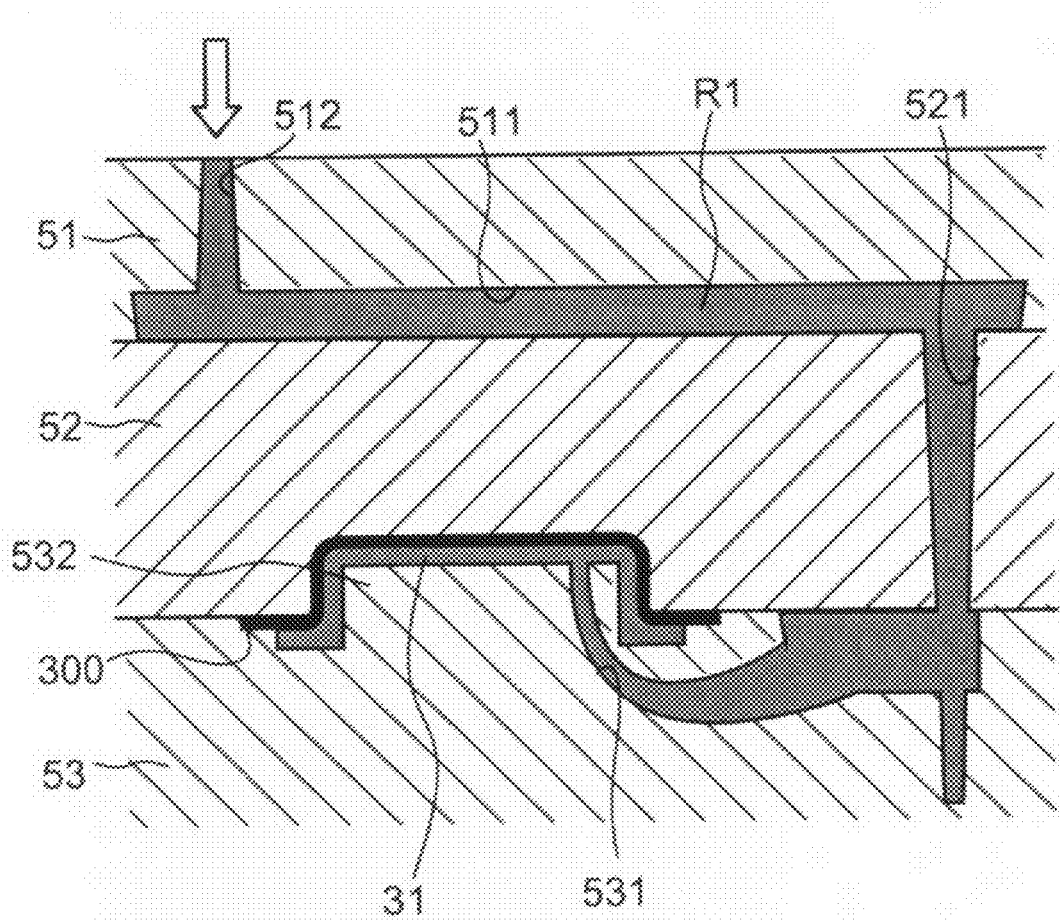
FIG. 9 is a cross-sectional diagram showing a process of forming a primary molded layer by the die apparatus.

FIG. 8 is a cross-sectional diagram of the in-mold foil 300. The in-mold foil 300 has a multilayer structure including a base film 301, a first adhesion layer 302, an in-mold layer 303, and a second adhesion layer 304. The in-mold layer 303 corresponds to the in-mold layer 33 described with reference to FIGS. 3 and 4. The first adhesion layer 302 causes the in-mold layer 303 to adhere onto the base film 301. The second adhesion layer 304 is used for transferring the in-mold layer 303 onto the surface of the primary molded layer 31. The in-mold foil 300 is placed between the second die plate 52 and the third die plate 53 such that the second adhesion layer 304 faces the third die plate 53.

Figure 10:
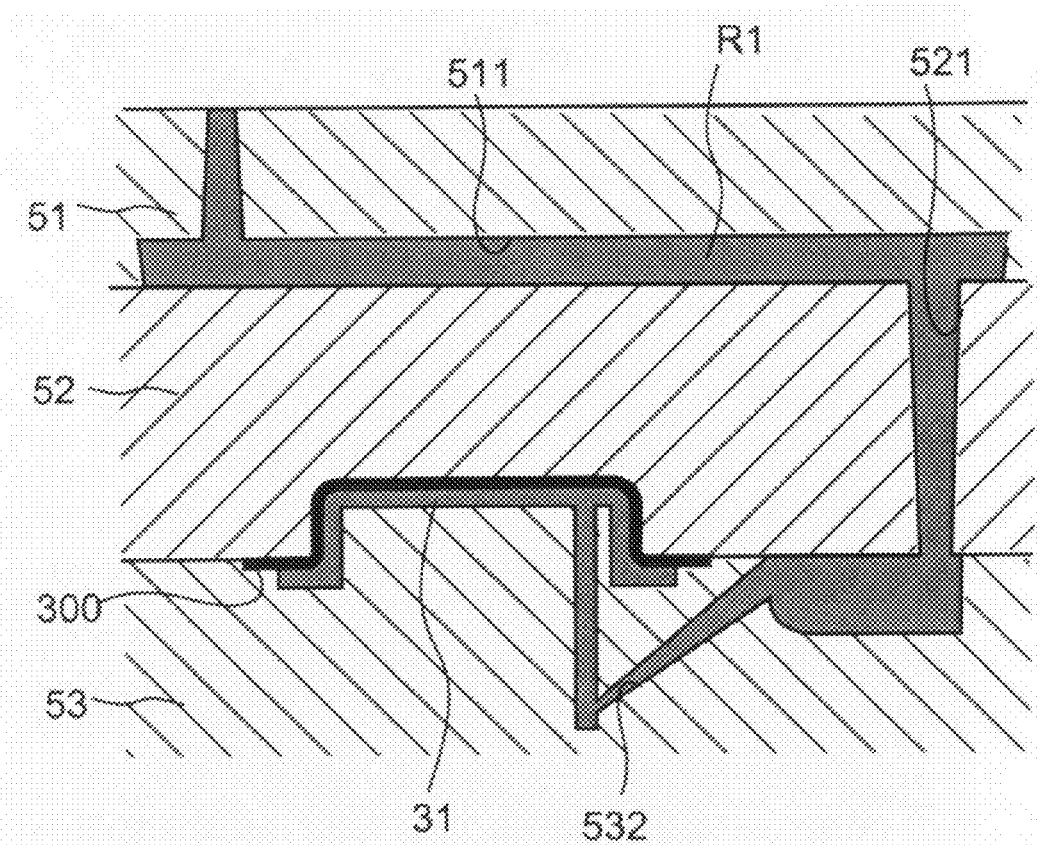
FIG. 10 is a cross-sectional diagram showing a modified example of a gate structure of the die apparatus.

Formed in the third die plate 53 is a first gate portion 531 for introducing a molten resin into the first cavity 522. A gate port of the first gate portion 531 is positioned on a cavity-opposing surface of the core 532. As shown in the figure, in this embodiment, a banana gate (curl-horn-type gate) is used for the first gate portion 531, though not limited thereto. As shown in FIG. 10, a submarine gate 532 may be used. The banana gate is automatically severed during demolding by an ejector pin after the molding. Thus, gate separation processing as post processing after the molding becomes unnecessary.

The second die plate 52 is formed with a sprue portion 521. Further, the first die plate 51 is formed with a first runner portion 511 communicating with the sprue portion 521. The first runner portion 511 is in communication with a first resin supply portion 512 formed on a surface of the first die plate 51. The first resin supply portion 512 is coupled to a first injection apparatus (not shown) that injects a molten resin for forming a primary molded layer.

When the second die plate 52 and the third die plate 53 are mold-clamped, the sprue portion 521 and the first gate portion 531 come into communication with each other. A first resin R1 for forming the primary molded layer 31 is supplied to the first cavity 522 from the first injection apparatus via the first resin supply portion 512, the first runner portion 511, the sprue portion 521, and the first gate portion 531. Molding conditions on a temperature, pressure, rate, and the like of a resin to be injected can be set as appropriate.

The first resin R1 is solidified by cooling the die apparatus after filling the first resin R1 in the first cavity 522. At this time, the in-mold foil 300 is pressed against the wall surfaces of the first cavity 522 by an inner pressure of the injected resin, and the in-mold layer 303 adheres onto the surface of the primary molded layer 31 by the second adhesion layer 304 softened by the resin temperature.

Figure 11:
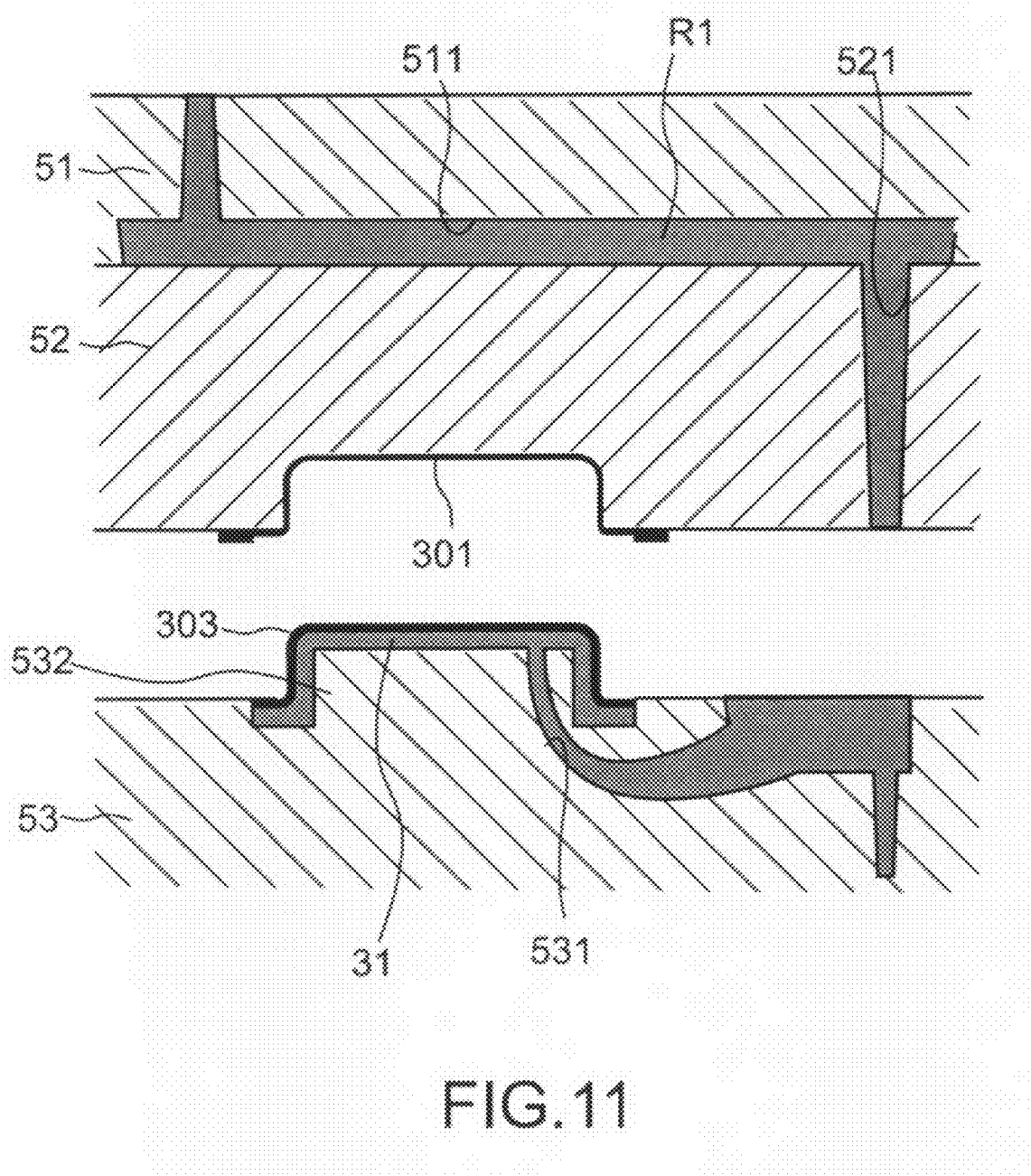
FIG. 11 is a cross-sectional diagram showing a mold-opening process of the die apparatus.

By the in-mold molding method as described above, the in-mold layer 303 is formed on the surface of the primary molded layer 31 simultaneous with the formation of the primary molded layer 31. As shown in FIG. 11, the in-mold layer 303 is transferred to the primary molded layer 31 side from the base film 301 side during the mold opening between the second die plate 52 and the third die plate 53. The primary molded layer 31 onto which the in-mold layer 303 has been transferred remains on the core 532 of the third die plate 53 after the mold opening.

(Formation of Secondary Molded Layer)

Figure 12:
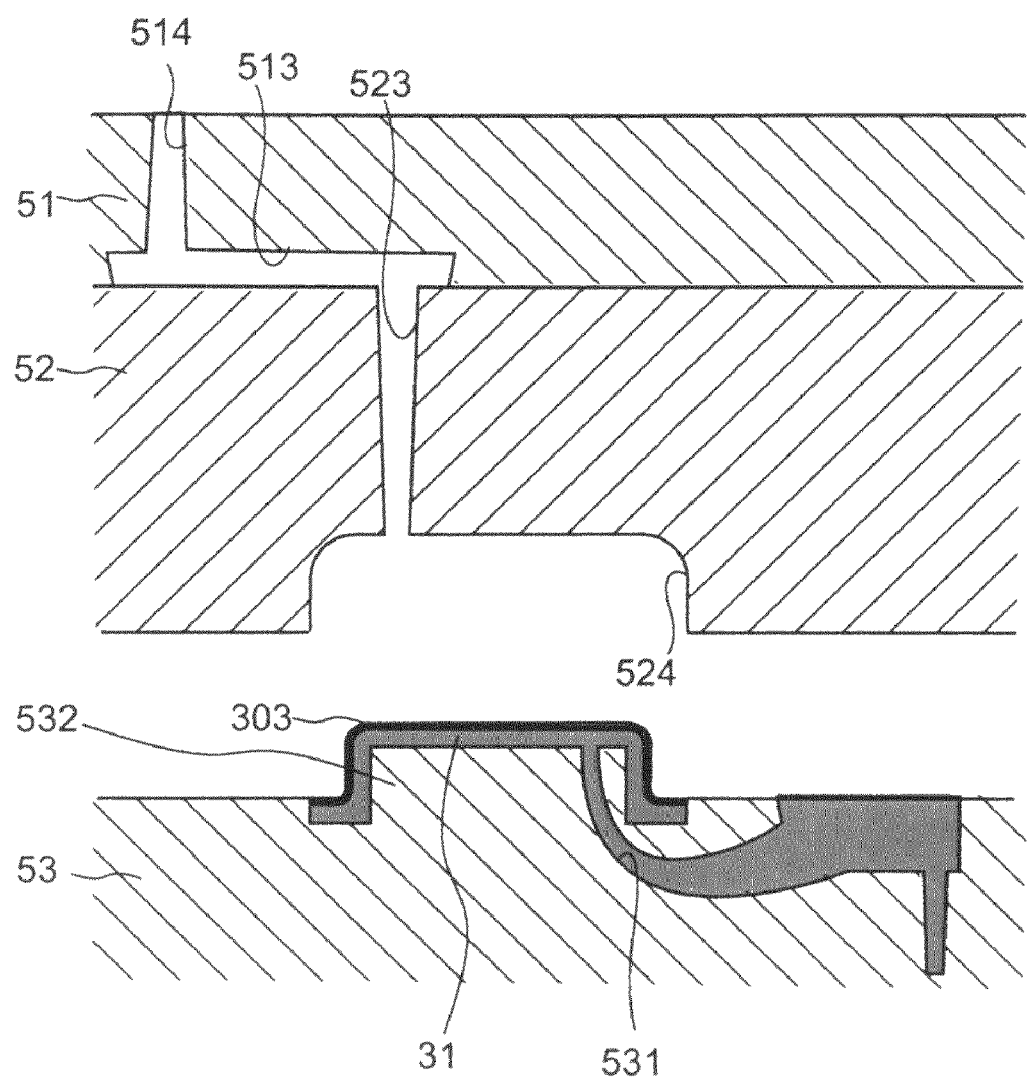
FIG. 12 is a cross-sectional diagram showing a die portion for forming a secondary molded layer in the die apparatus.

FIG. 12 is a schematic cross-sectional diagram of a die portion for forming the secondary molded layer 32 in a die apparatus for producing a molded component constituting the second casing component 22.

The third die plate 53 on the movable side is placed on a rotary table (not shown) that is rotatable within a plane. After the primary molded layer 31 is formed, the third die plate 53 rotates 180 degrees about a rotary shaft of the rotary table, for example, to be positioned at a molding position of the secondary molded layer 32. The second die plate 52 further includes a second cavity 524 for secondary molding. The second cavity 524 is formed in correspondence with the position to which the core 532 is rotated 180 degrees. Therefore, when the third die plate 53 is rotated 180 degrees together with the primary molded layer 31 after the primary molded layer 31 is formed, the core 532 is in an opposing positional relationship with the second cavity 524.

Figure 14:
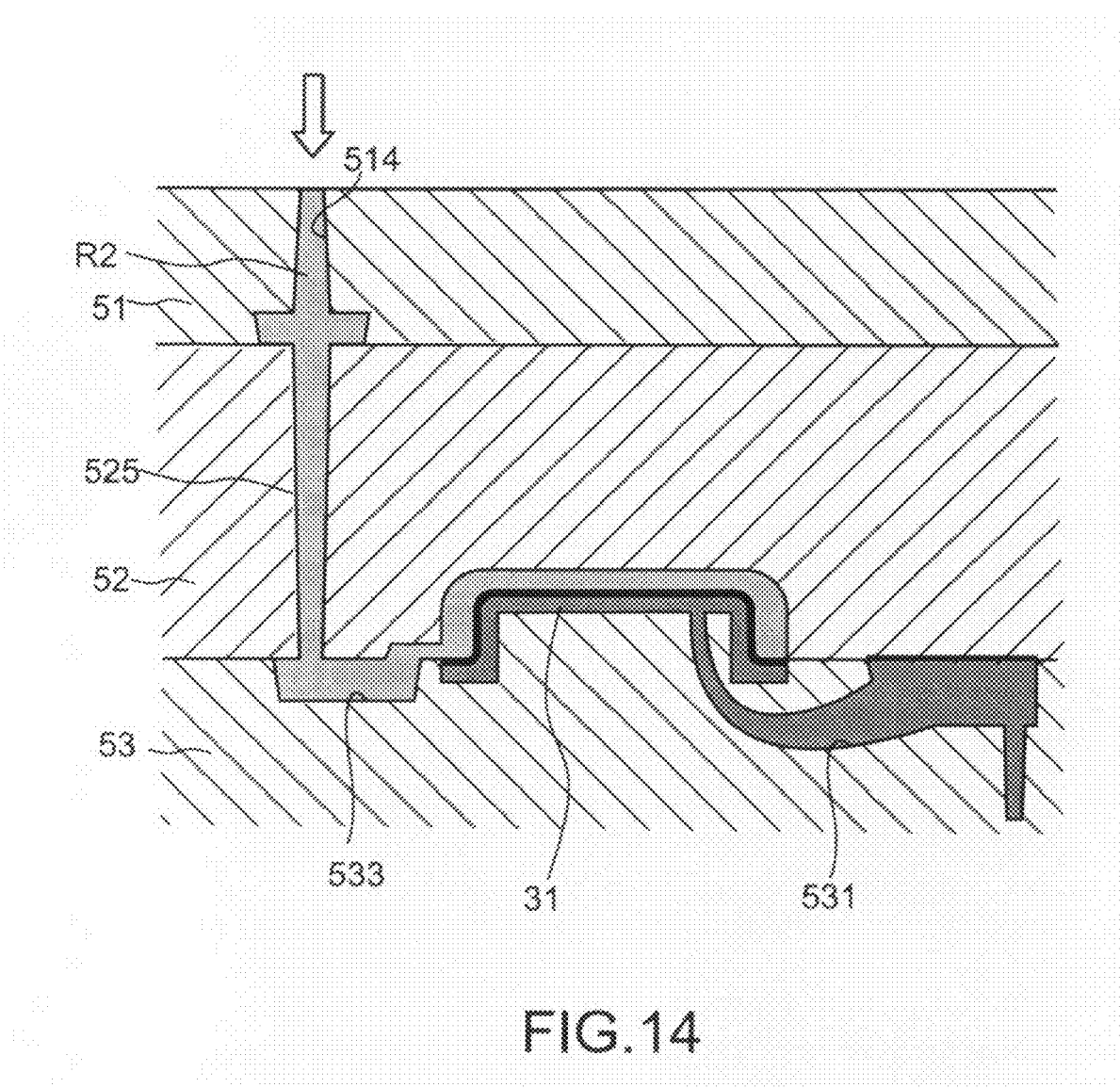
FIG. 14 is a cross-sectional diagram showing a modified example of the gate structure of the die apparatus.

Formed in the second die plate 52 is a second gate portion 523 for introducing a molten resin into the second cavity 524. A gate port of the second gate portion 523 is located on a bottom surface of the second cavity 524. As shown in the figure, in this embodiment, a pinpoint gate is used as the second gate portion 523, though not limited thereto. As shown in FIG. 14, a side gate (edge gate) 533 may be used as the second gate portion 523. In this case, the side gate 533 is formed in the third die plate 53, and a gate port thereof is located on a circumferential side portion of the second cavity 524. In addition, a sprue portion 525 is formed in the second die plate 52 in place of the second gate portion 523.

As shown in FIG. 12, the first die plate 51 further includes a second runner portion 513 that is in communication with the second gate portion 523. The second runner portion 513 is in communication with a second resin supply portion 514 formed on the surface of the first die plate 51. The second resin supply portion 514 is coupled to a second injection apparatus (not shown) that injects a molten resin for forming a secondary molded layer.

Figure 13:
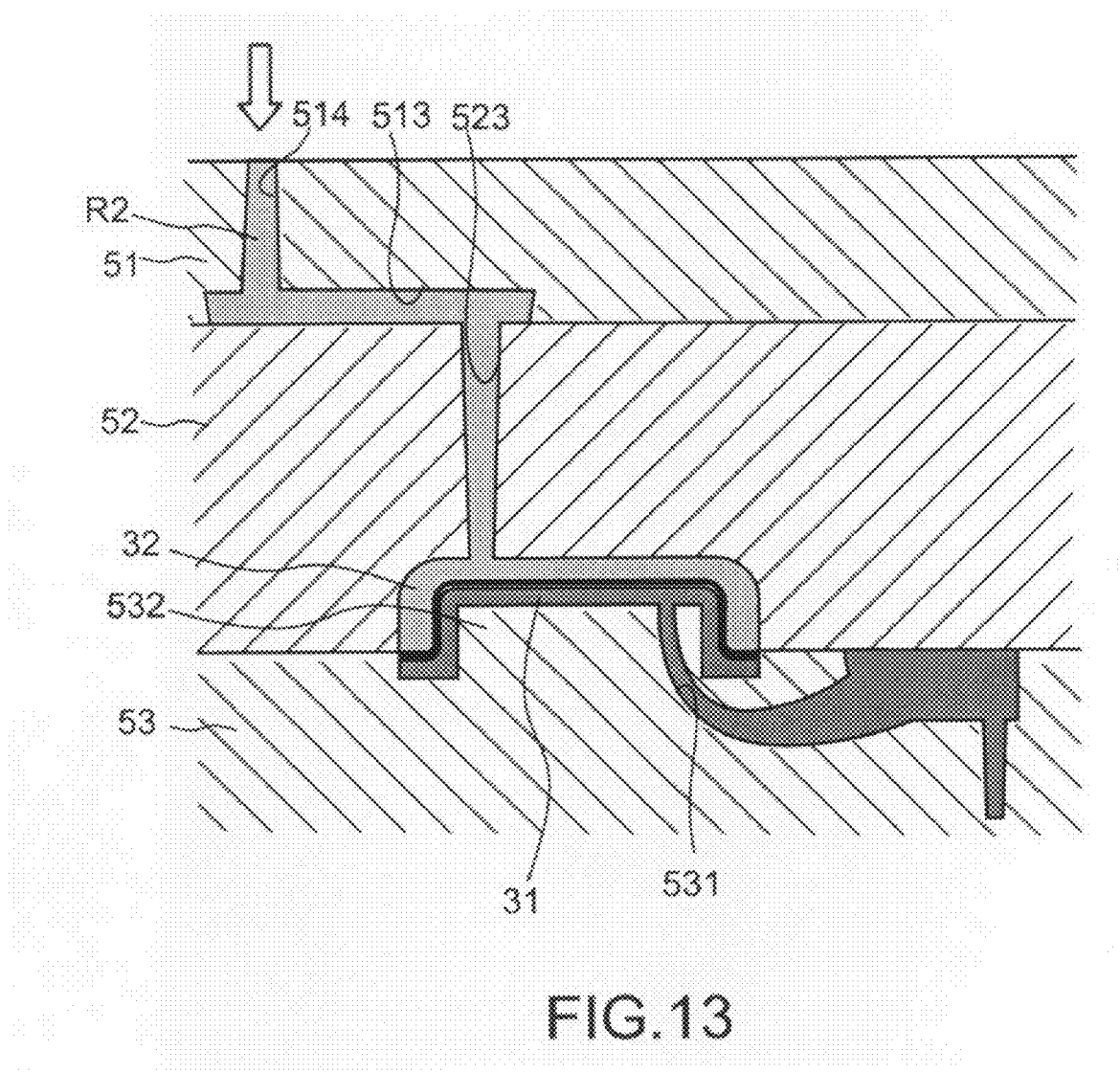
FIG. 13 is a cross-sectional diagram showing a process of forming a secondary molded layer by the die apparatus.

FIG. 13 is a schematic cross-sectional diagram showing a state where the second die plate 52 and the third die plate 53 are mold-clamped. The primary molded layer 31 and the core 532 are accommodated in the second cavity 524. A gap space between the primary molded layer 31 and the second cavity 524 has an inner shape corresponding to an outer shape of the secondary molded layer 32. An optically-transparent second resin R2 for forming the secondary molded layer 32 is supplied to the second cavity 524 from the second injection apparatus via the second resin supply portion 514, the second runner portion 513, and the second gate portion 523. Molding conditions on a temperature, pressure, rate, and the like of a resin to be injected can be set as appropriate.

The second resin R2 is solidified by cooling the die apparatus after filling the second resin R2 in the second cavity 524. After that, by the mold opening between the second die plate 52 and the third die plate 53, a molded component in which the in-mold layer 303 and the secondary molded layer 32 are laminated on the primary molded layer 31 in the stated order is produced. The demolding of the secondary molded layer 32 from the second cavity 524 and the demolding of the primary molded layer 31 from the core 532 are performed using ejector pins (not shown) arranged at arbitrary positions in the second die plate 52 and the third die plate 53.

By combining the in-mold molding method and the two-color molding method as described above, the second casing component 22 of this embodiment is produced. In this embodiment, by rotating the third die plate 53 as a movable die after the primary molded layer 31 is formed, the secondary molded layer 32 is formed. With this structure, a molded component having the structure described above can be easily produced by a single die apparatus.

Further, the in-mold foil 300 is placed on the second die plate 52 as a fixed die, and the first cavity 522 is formed on the second die plate 52 side. With this structure, it becomes possible to place the primary molded layer 31 onto which the in-mold layer 303 (33) has been transferred on the movable die side after the molding opening.

Furthermore, in this embodiment, the first resin supply portion 512 for supplying a resin for molding the primary molded layer 31 to the first cavity 522 is formed at a position different from the rotational center of the third die plate 53. With this structure, a degree of freedom in arranging the second resin supply portion 514 for supplying a resin for molding the secondary molded layer 32 to the second cavity 524 is enhanced, with the result that die design becomes easier.

The embodiment of the present invention has been described heretofore. However, the present invention is of course not limited thereto, and various modifications can be made based on the technical idea of the present invention.

For example, although an injection-molded body formed of a synthetic resin material has been used for the primary molded layer 31 as a molded component constituting the second casing component 22 in this embodiment, a processed molded component such as a press-molded body of a metal plate may be used instead. Examples of the constituent material of the metal plate include a magnesium alloy, an aluminum alloy, and a steel material.

The molded component according to the embodiment of the present invention is not limited to an application to a casing portion for a display portion of a video camera. For example, the present invention is applicable to an outer frame of a display and a casing component of other electronic apparatuses such as a cellular phone and a portable game device. Moreover, in addition to the casing component of an electronic apparatus, the present invention is also applicable to various kinds of domestic equipment and office equipment such as a case, a decoration tool, a lamp fitting, and a container.

Further, a molded component production apparatus according to the embodiment of the present invention is not limited to the 3-plate-type die apparatus described above, and a 2-plate-type die apparatus may be used instead, for example.

Figure 15:
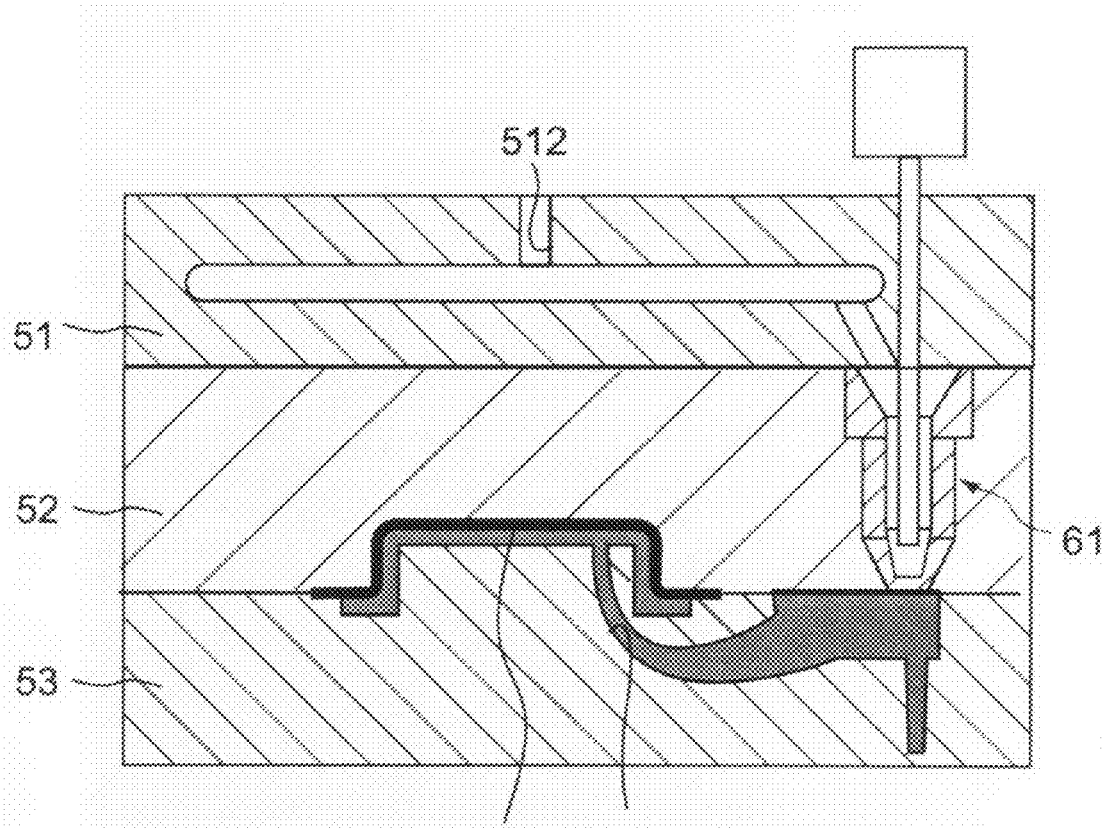
FIG. 15 is a cross-sectional diagram showing a modified example of the structure of the die portion for forming a primary molded layer in the die apparatus.
Figure 16:
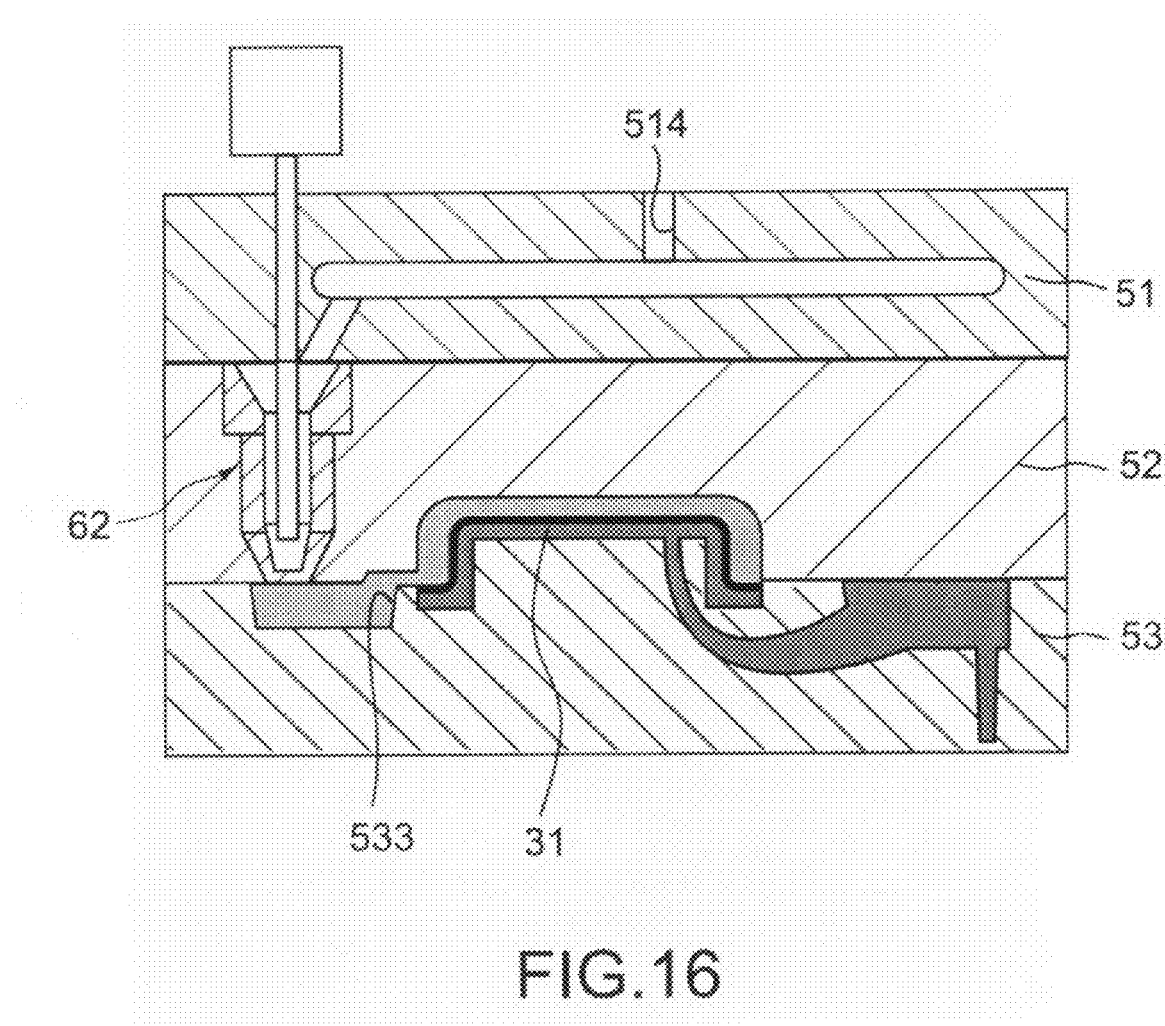
FIG. 16 is a cross-sectional diagram showing a modified example of the structure of the die portion for forming a secondary molded layer in the die apparatus.

Furthermore, the above embodiment has described the example where a resin injection apparatus is provided outside the die apparatus in forming the primary molded layer 31 and the secondary molded layer 32. Alternatively, as shown in FIGS. 15 and 16, it is also possible to use a hot runner that injects a molten resin inside a die apparatus. FIG. 15 shows an example where a first hot runner 61 for directly injecting a molten resin into the gate portion 531 for forming the primary molded layer 31 is provided in the second die plate 52. FIG. 16 shows an example where a second hot runner 62 for directly injecting a molten resin into the gate portion 533 for forming the secondary molded layer 32 is provided in the second die plate 52.

The present application contains subject matter related to that disclosed in Japanese Priority Patent Application JP 2008-294175 filed in the Japan Patent Office on Nov. 18, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A molded component, comprising:
a primary molded layer including
a boxlike base portion that has a width direction in a first direction, a length direction in a second direction, and a height direction in a third direction and includes a first surface protruding in the third direction and a second surface that forms a spatial portion on the other side of the first surface, and
a pedestal portion protruding outwardly in parallel to the first direction and the second direction from a circumferential edge of the base portion;
a secondary molded layer formed of an optically-transparent resin material, that is laminated on the primary molded layer and has the same width and length as the primary molded layer; and
an in-mold layer formed between the primary molded layer and the secondary molded layer.

2. The molded component according to claim 1, wherein the in-mold layer is a print layer for decorating the primary molded layer.

3. The molded component according to claim 2, wherein a boundary between the first surface and the pedestal portion is curved.

4. The molded component according to claim 3, wherein the secondary molded layer has a thickness gradient.

5. The molded component according to claim 1, wherein the primary molded layer is a processed metal plate.

6. An electronic apparatus, comprising:
a first casing including
a primary molded layer including
a boxlike base portion that has a width direction in a first direction, a length direction in a second direction, and a height direction in a third direction and includes a first surface protruding in the third direction and a second surface that forms a spatial portion on the other side of the first surface, and
a pedestal portion protruding outwardly in parallel to the first direction and the second direction from a circumferential edge of the base portion,
a secondary molded layer formed of an optically-transparent resin material, that is laminated on the primary molded layer and has the same width and length as the primary molded layer, and
an in-mold layer formed between the primary molded layer and the secondary molded layer; and
a second casing including an accommodation portion that accommodates the first casing.

7. The electronic apparatus according to claim 6, wherein the first casing is rotatably attached to the second casing.

8. The electronic apparatus according to claim 7, further comprising
a display device accommodated in the spatial portion.

9. A method of producing a molded component, comprising:
placing a transfer film for supporting an in-mold layer in a first cavity;
forming, by injecting and filling a molten resin between a movable core and the first cavity from the movable core side, a primary molded layer including a boxlike base portion that has a width direction in a first direction, a length direction in a second direction, and a height direction in a third direction and includes a first surface protruding in the third direction, on which the in-mold layer is transferred, and a second surface that forms a spatial portion on the other side of the first surface, and a pedestal portion protruding outwardly in parallel to the first direction and the second direction from a circumferential edge of the base portion; and forming, by injecting and filling an optically-transparent molten resin between the movable core and a second cavity that accommodates the primary molded layer, a secondary molded layer that is laminated on the primary molded layer with the in-mold layer interposed therebetween and has the same width and length as the primary molded layer.

* * * * *